July 31, 1962 H. PROHASKA ET AL 3,046,591
FOOT-OPERATED BELLOWS PUMP FOR WINDSHIELD WASHING APPARATUS
Filed Aug. 19, 1958 2 Sheets-Sheet 1

INVENTORS
HANS PROHASKA
ALFRED KOHLER
BY *Dicke and Craig*
ATTORNEYS

July 31, 1962   H. PROHASKA ET AL   3,046,591
FOOT-OPERATED BELLOWS PUMP FOR WINDSHIELD WASHING APPARATUS
Filed Aug. 19, 1958   2 Sheets-Sheet 2

INVENTORS
HANS PROHASKA
ALFRED KOHLER
BY Dick and Craig
ATTORNEYS

United States Patent Office 3,046,591
Patented July 31, 1962

3,046,591
FOOT-OPERATED BELLOWS PUMP FOR WINDSHIELD WASHING APPARATUS
Hans Prohaska and Alfred Kohler, Bietigheim, Wurttemberg, Germany, assignors to SWF-Spezialfabrik für Autozubehör Gustav-Rau G.m.b.H., Bietigheim, Wurttemberg, Germany
Filed Aug. 19, 1958, Ser. No. 756,025
Claims priority, application Germany Aug. 21, 1957
10 Claims. (Cl. 15—250.02)

The present invention relates to a foot-operated bellows pump for a windshield washing apparatus of a motor vehicle.

The foot-operated pumps for windshield washing apparatus which were known prior to this invention and consisted of a rubber bellows were sometimes provided with means for starting the operation of a windshield wiper simultaneously with the compression of the rubber bellows. These means generally consisted of a mechanical transmission connecting the foot pedal of the pump which acted upon the bellows with a suitable switch on the windshield wiper motor, or of a separate electric switch which was operated directly by the foot pedal. These means render the entire mechanism rather cumbersome and difficult to install, and they are also easily acted upon by outer influences which affect the reliability of the operation of the mechanism.

It is an object of the present invention to provide a bellows pump for a windshield washing apparatus which is combined with a switch for operating the windshield wiper motor so that both together form a single compact element.

A further object of the present invention is to provide the switch within the pump itself, and preferably within an aperture in the base thereof on which the rubber bellows is mounted.

Since windshield wiper motors with a magnetic field formed by a permanent magnet and with a cam-controlled set of electric contacts for automatically stopping the windshield wipers in a certain position require a four-pole, switch, the switch mounted according to the invention within the pump itself is also of the four-pole variety. In connection with such a switch, it is another feature of the invention to connect the circuit-closing contact of this switch in parallel to the circuit-closing contact of the hand-operated switch for the windshield wiper motor, and to connect the circuit-breaking contacts which close a short circuit passing through the motor armature, so as to lie in series with each other and in series with the armature and the ground. Such circuit connection permits both switches to be operated independently of each other so that the windshield wiper motor may be started or stopped either alone by the hand switch or, simultaneously with the operation of the bellows pump of the windshield washing apparatus, by the foot switch.

Another feature of the invention consists in providing suitable resilient means within the bellows chamber of the pump which are adapted to be compressed when the bellows is being compressed, whereby a certain amount of the pressure which is exerted by the foot upon the bellows will be transmitted by those resilient means to the switch which is disposed within the base or bottom of the bellows, so that the switch will thus be actuated.

According to a further feature of the invention these resilient pressure transmitting means consist of a diaphragm which closes the open end of the bellows opposite to the wall which is stepped upon by the foot and is stretched across this open end closely above the switch, and they further consist of a resilient loop-shaped member which engages at one side with the inside of the mentioned wall and at the opposite side with the diaphragm. This loop-shaped member and the diaphragm are preferably integral with each other and made of a single piece of resilient material, for example, rubber or plastic. The wall portion of the bellows which is acted upon by the foot preferably has on its outside a thick knoblike projection serving as a pedal, and on its inside a concave recess into which the loop-shaped member may engage which is thus guided and prevented from slipping laterally away from a central point on the mentioned wall when the same is depressed by the foot. Due to its shape, this loop-shaped member will transmit a part of the pressure exerted by the foot upon the bellows to the foot switch, and it will thereby be compressed without preventing the full compression of the bellows.

In order to prevent any damage to the foot switch, the same is provided with a yoke-shaped spring on which an insulating bridge member is secured which is adapted to act upon the switch contacts, and with a projection on one arm of such spring of a length shorter than the width between the two arms. This projection will serve as a stop member and allow the respective contacts of the switch to be engaged with each other only to an extent sufficient to form a proper electrical connection.

For securing the bellows to its base, its open edge portions may be vulcanized thereto, while the diaphragm with the loop-shaped member thereon may be secured to this open end of the bellows by providing the base of the bellows with a substantially central aperture into which a pot-shaped housing containing the foot switch is fitted, and by providing the open end of such housing with an outwardly projecting flange or rim over which the diaphragm is stretched and which firmly clamps or grips the edge portions of the diaphragm as well as the free edge portions of the bellows and thus seals the bellows chamber tightly toward the outside.

Further objects, features, and advantages of the present invention will become apparent from the following detailed description thereof, particularly when read with reference to the accompanying drawings, in which—

FIGURE 3 shows a perspective view of the foot switch with a part of the housing thereof being broken away; while

Figure 1:
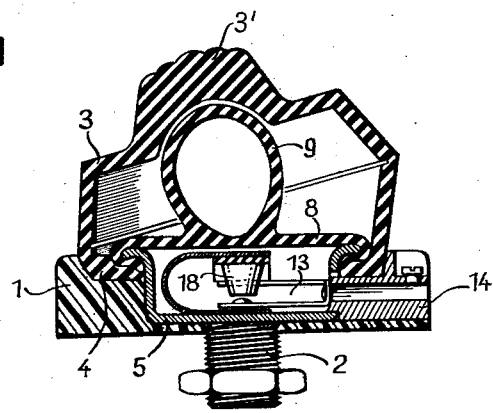
FIGURE 1 shows a central vertical cross section of the bellows pump according to the invention and of the foot switch mounted in the base thereof.
Figure 2:
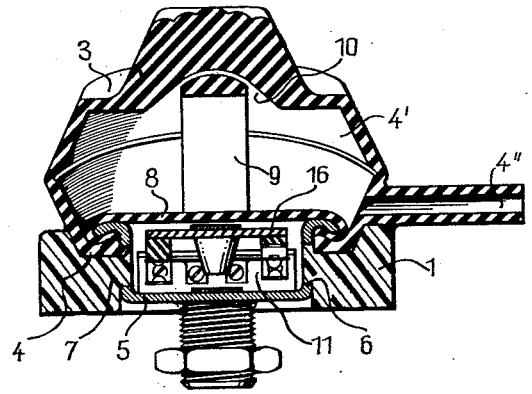
FIGURE 2 shows a similar cross section taken at a right angle to FIGURE 1.

Referring to the drawings, the apparatus according to the invention comprises a socket like base 1 which is adapted to be mounted on the floor of a car by means of a screw connection 2 and carries a hollow rubber bellows 3, the lower open end 4 of which is secured to base 1, for example, by being vulcanized therein. The upper end of bellows 3 forms a knob 3' of solid rubber which, when stepped upon by a foot, will compress bellows 3 to pump the washing fluid from chamber 4' through the outlet 4''. A substantially central aperture in base 1 contains a switch housing 5 with suitable apertures 6 in its side wall into which inwardly projecting portions 7 of base 1 engage resiliently to secure housing 5 within the base. The upper edge of housing 5 has an outwardly projecting flange which firmly clamps the edge portions of diaphragm 8, as well as the edge portions of bellows 1, and thus serves together with diaphragm 8 as the sealing member for closing the bellows chamber toward the outside. Diaphragm 8 forms the base of a resilient loop-shaped member 9, the upper end of which extends into a recess 10 at the lower side of the knob portion 3'. Thus, if knob 3' is stepped upon to compress bellows 3 to exert a pumping stroke, knob 3' also acts upon diaphragm 8. Due to its shape the loop-shaped member 9 will, however, not prevent bellows 3 from being fully compressed to exert a full pumping stroke.

Figure 3:
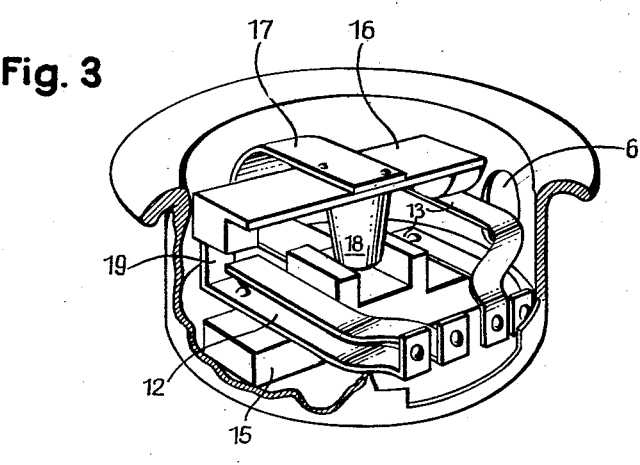

Housing 5 contains a four-pole switch 11, the construction of which is illustrated in greater detail in FIGURE 3. It contains two pairs of plate-spring contacts 12 and 13 which are secured at one end to a terminal strip 14 which is not shown in FIGURE 3 for the sake of clarity. Contacts 12 and 13 are insulated relative to housing 5 and relative to each other by an insulating member 15. A yoke-shaped spring 17, one arm of which is secured to the bottom of housing 5, carries on its other arm a bridge member 16 of insulating material which crosses the two sets of contacts 12 and 13. Contacts 12 are normally in engagement with each other, while contacts 13 are normally separated from each other. When knob 3' is stepped upon to compress bellows 3, diaphragm 8 will also be depressed through the loop-shaped portion 9 and act upon spring 17, whereby the bridge member 16 will close contacts 13 and simultaneously open contacts 12 by engaging with an upwardly bent extension 19 on the lower spring 12. A central projection 18 on bridge member 16 prevents the latter from being depressed too deeply and it thus also prevents an excessive action upon diaphragm 8 and supports the latter.

Figure 4:
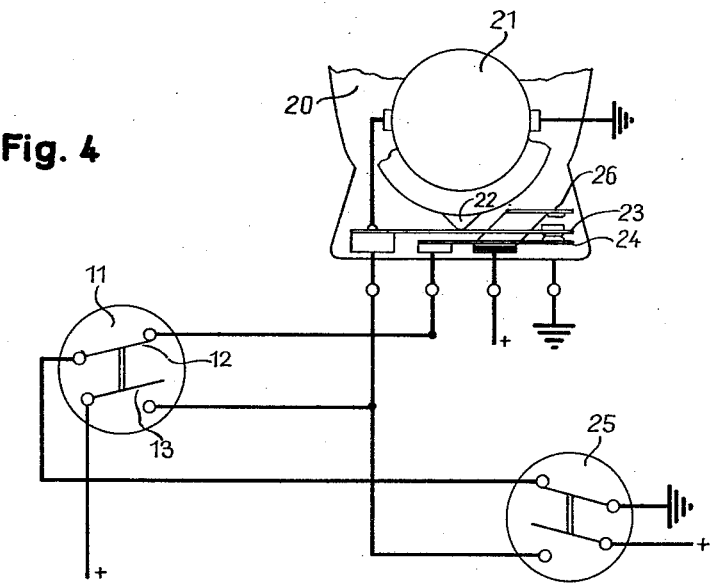
FIGURE 4 shows a circuit diagram of the foot switch and the usual hand switch for operating the windshield wiper motor in connection with a switch for returning the windshield wipers to a certain fixed position when the motor thereof has been stopped.

The switching operation is illustrated in detail in FIGURE 4. A windshield wiper motor 20 by means of its armature 21 and a gearing (not shown), drives a cam 22 which in the normal position of rest depresses a contact spring 23 and connects its contact with a grounded contact 24. The ground or break contacts in a hand switch 25 and in foot switch 11 within the pump are connected in series with each other and with contact spring 24. When foot switch 11 is depressed and hand switch 25 is likewise engaged, the make contact 13 of switch 11 and the make contact of hand switch 25 connect the positive terminal of the battery with armature 21 and the switch contact 23. After motor 20 has started to run, the biased contact 23 will engage with a contact 26 which is connected to the positive terminal so that the battery current will also flow through the armature 21. Consequently, even after switch 11 or switch 25 has been disconnected, motor 20 will continue to run until cam 22 will engage with contact 23 and thereby separate contacts 23 and 26 and cut off the current supply entirely. However, in this cam or contact position which corresponds to the position of rest of the windshield wiper, motor 20 will also be short-circuited and thus immediately stopped by the connection from the ground, through armature 21, contacts 23 and 24, and back to the ground. Thus, when the foot pressure on bellows 3 is released and foot switch 11 is disengaged, motor 20 will be stopped in the same manner as if hand switch 25 is operated. Thus, the windshield wiper motor 20 may be operated either by hand switch 25 or by foot switch 11, and when the latter is operated, bellows 3 will at the same time exert a full pumping stroke and deliver a stream of water or other cleaning fluid to the windshield.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A foot-operated pressure pump for a windshield washing apparatus of a motor vehicle comprising a rubber bellows having a hollow chamber therein, an electric switch for operating a windshield wiper motor mounted on said bellows, and switch-actuating means within said chamber including elastic force-transmitting means adapted to directly abut against said switch for elastically actuating said switch by abutment thereagainst of said elastic force-transmitting means upon compression of said bellows.

2. A pressure pump as defined in claim 1, further comprising a base, said bellows being secured to said base, said base having an aperture therein, said switch being mounted within said aperture, and means for securing said base to the floor of a vehicle.

3. A pressure pump as defined in claim 1, further comprising a base, said bellows being secured to said base, said base having an aperture therein, said switch comprising a housing mounted within said aperture, said resilient diaphragm being interposed between said bellows chamber and said switch and closing said aperture toward said bellows chamber, said resilient member within said chamber being connected at one end thereof to said diaphragm and substantially engaging at the other end thereof with the inner wall of said chamber for resiliently transmitting the compression movement of said bellows through said diaphragm to said switch to actuate the same.

4. A pressure pump as defined in claim 3, wherein said resilient member within said bellows chamber is loop-shaped and connected at one side of the loop to said diaphragm substantially at the center thereof and substantially engages at the opposite side of said loop with said inner wall.

5. A pressure pump as defined in claim 4, wherein said diaphragm and said loop-shaped member together consist of one integral piece of resilient material.

6. A pressure pump as defined in claim 3, wherein said switch further comprises a rigid housing, means for securing the elements of said switch within said housing, said housing being secured within said aperture in said base and having an open end facing toward said diaphragm with an outwardly projecting flange on said end, said diaphragm being tightly stretched over said open end and around said flange, said flange clamping the outer edge portions of said diaphragm and also securing said bellows to said base.

7. A pressure pump as defined in claim 5, further comprising a screw-threaded member secured to the outside of the bottom of said switch housing for securing the entire pump to the floor of a vehicle.

8. A pressure pump as defined in claim 5, wherein said switch comprises a yoke-shaped spring member, one arm of said spring member being secured to the bottom of said housing, an insulating member secured to the other arm and adapted to act upon said switch elements, and a member secured to said other arm and projecting toward said bottom, but having a length shorter than the width between said arms and adapted to limit the movement of said other arm toward said bottom when said bellows is being compressed, and then also supporting said diaphragm and preventing its undue extension.

9. In an automobile having a windshield wiper and a washing means, a motor for operating the wiper, means for controlling said wiper motor including a foot-operated switch and a hand-operated switch, a foot-operated pump comprising in part said washing means and having a rubber bellows and an elastic force-transmitting means adapted to directly abut against said foot-operated switch for actuating said switch by abutment thereagainst upon compression of said rubber bellows, said force-transmitting means being arranged essentially within said rubber bellows, said controlling means being so constructed and arranged that said foot-operated switch may independently start and stop said motor when said hand-operated switch is in its off position, and comprising circuit means including said foot-operated switch and said hand-operated switch, each of said switches being a four-pole switch having circuit-making contacts and circuit-breaking contacts, and a make-and-break contact acted upon by said motor, said circuit-making contacts of both of said switches being connected in parallel with each other, and said circuit-breaking contacts being adapted to close a short circuit passing through the armature of said motor and being connected in series with each other and with said make-and-break contact of said motor.

10. In an automobile having a windshield wiper and a washing means, a motor for operating the wiper, means for controlling said wiper motor comprising a circuit including a foot-operated switch and a hand-operated switch, a foot-operated pump having a rubber bellows comprising in part said washing means and an elastic force-transmitting means arranged within said bellows, said foot-operated switch being operatively connected to said pump and being so constructed and arranged as to be actuated by abutment thereagainst of said elastic force-transmitting means upon compression of said bellows, and said circuit being so constructed and arranged that said foot-operated switch may independently start and stop said motor when said hand-operated switch is in its off position.

References Cited in the file of this patent

UNITED STATES PATENTS

| | | |
|---|---|---|
| 2,499,298 | Christensen | Feb. 28, 1950 |
| 2,812,402 | Dixon | Nov. 5, 1957 |
| 2,855,784 | Dyer | Oct. 14, 1958 |
| 2,856,626 | Marte | Oct. 21, 1958 |
| 2,864,116 | Rohr | Dec. 16, 1958 |
| 2,877,485 | Oishei | Mar. 17, 1959 |

FOREIGN PATENTS

| | | |
|---|---|---|
| 933,550 | France | Apr. 23, 1948 |